March 10, 1959　　　K. REPPERT　　　2,876,984
BUTTERFLY VALVES
Filed Dec. 21, 1953　　　　　　　　　3 Sheets-Sheet 1

Inventor:
KARL REPPERT

March 10, 1959  K. REPPERT  2,876,984
BUTTERFLY VALVES

Filed Dec. 21, 1953  3 Sheets-Sheet 2

Inventor:
KARL REPPERT
BY
ATTORNEY

United States Patent Office 2,876,984
Patented Mar. 10, 1959

2,876,984

BUTTERFLY VALVES

Karl Reppert, Heidenheim (Brenz), Germany, assignor to Johannes Erhard, Heidenheim (Brenz), Germany, a firm Application December 21, 1953, Serial No. 399,419

Claims priority, application Germany March 22, 1952

4 Claims. (Cl. 251—175)

The present invention concerns butterfly valves for controlling fluids flowing in pipe lines.

This application is a continuation-in-part of U. S. patent application Serial No. 343,427, filed on March 19, 1953, now abandoned.

As is known, the obtaining of a perfect seal in the case of butterfly throttle valves in the closed position creates considerable difficulties. In the case of butterfly throttle valves of the usual construction for the shutting off of pipe lines the flap is secured to a rotatable shaft which is pivotally mounted at its two ends in supporting bearings on the casing. In the shut-off position the flap lies usually at an angle of 70°. To fulfill the desired operational conditions, the construction of the seating for both parts of the valve is usually made of rigid material, usually metallic such as cast iron, and difficulties arise in securing a perfectly tight seal. In order to obtain a better seal special constructions have been adopted for instance by providing a rubber sealing ring on the flap or on the casing. Apart from the disadvantages resulting from the great wear and tear on this part and the scope of utility of such throttle flaps in regard to the nature of the fluid passing through, leakage can occur at the gap where the shaft passes through the casing.

Throttle valves are also known in which the flap has an axial displacement apart from its usual rotary motion in such a way that the flap, when closing, is first twisted into the closed position and is then axially displaced onto the sealing ring, while, when the valve is opening, the flap of the latter is first raised axially from its sealing seat and is then twisted into the open position. For this purpose separate driving means for the rotary motion of the flap are necessary, on the one hand, and for its axial displacement, on the other hand, a fact which makes a complicated construction necessary and which, therefore, easily causes difficulties in its operation. Thus, for example, a drive consisting of two racks with servo motor has been provided, in which by moving the two racks in the same direction the axial displacement is effected and by moving the two racks relatively to one another, the rotary motion of the flap is produced. Another construction uses two separate hand wheel drives in order to be able to obtain the desired axial movements and also the rotary movements, independently of each other. Finally, even complicated eccentric drives have been proposed for obtaining the two desired separate movements of the flap.

It is, therefore, one object of the present invention to provide a butterfly valve which avoids the disadvantages of such prior constructions which are unwieldy and complicated.

It is another object of the present invention to provide a butterfly valve wherein relative resilient axial displaceability between the seating in the casing and the complementary valve surface presented by the flap is achieved in such a manner that the said complementary valve surface can be urged into more perfect sealing contact with the seating in the casing by the action thereon of the shut-off fluid medium, and in order to provide such resilient displaceability of the complementary valve surface, the flap itself may be resiliently mounted upon its pivot.

It is still another object of the present invention to provide a butterfly valve in which an elastic bearing is arranged for the flap, permitting of its axial displacement by the action of the static pressure of the cut-off fluid stream, thereby greatly simplifying in this manner the displacement of and the mechanical construction of such a throttle valve.

It is yet another object of the present invention to provide a butterfly valve in which, in order to obtain the additional axial displacement desired, there are inserted in the support of the flap, elastic elements such as rubber cushions, springs or the like which are compressed under the operation of the static pressure of the fluid dammed-up in front of the closing element of the valve and, thereby, render possible, a certain degree of axial displacement of the flap relative to its support, the resilient intermediate elements, in addition, allowing the two preferably metallic, sealing surfaces to perfectly uniformly accommodate themselves one on the other, whereby any small inclined relative disposition of the sealing surfaces is compensated.

It is also an object of the present invention to provide a preferred form of construction of the valve, wherein the flap is carried by lateral bearing supports allowing its pivotal movement without the use of a through shaft, these supports being rotatably mounted and capable of sliding in bearing grooves of the casing wall, and in order to keep the frictional forces low in the construction of the throttle valve, in accordance with the present invention, the elastic spring elements can be initially stressed so that the axial displacement only occurs shortly before the closed position and is effected without special driving means.

It is an already known feature in valves to construct the surfaces of the throttle member and the seat which it engages of spherical form. It is also another object of the present invention to provide a butterfly valve wherein the sealing ring of the casing and the sealing ring of the flap with spherical surfaces are separated from each other with slight radial play which, in the axial closing motion of the flap are pressed one upon the other with a sealing effect, in which case the flap is at 90° in the shut-off position, that is to say it lies transversely to the axis of the pipe.

It is also an additional object of the present invention to provide a butterfly valve in which the sealing surfaces of the packing ring on the housing and of the packing ring on the flap are preferably given a spherical shape, and the packing ring on the housing and/or the packing ring on the flap may have rubberized sealing surfaces, and a separate packing ring is preferably mounted between the flap and its normal packing ring, this separate packing ring preventing the passage of even small amounts of working medium into the space behind the flap when in the closed position.

With these and other objects in view which will become apparent in the following detailed description, the present invention will be clearly understood in connection with the accompanying drawings, in which.

Figure 1:
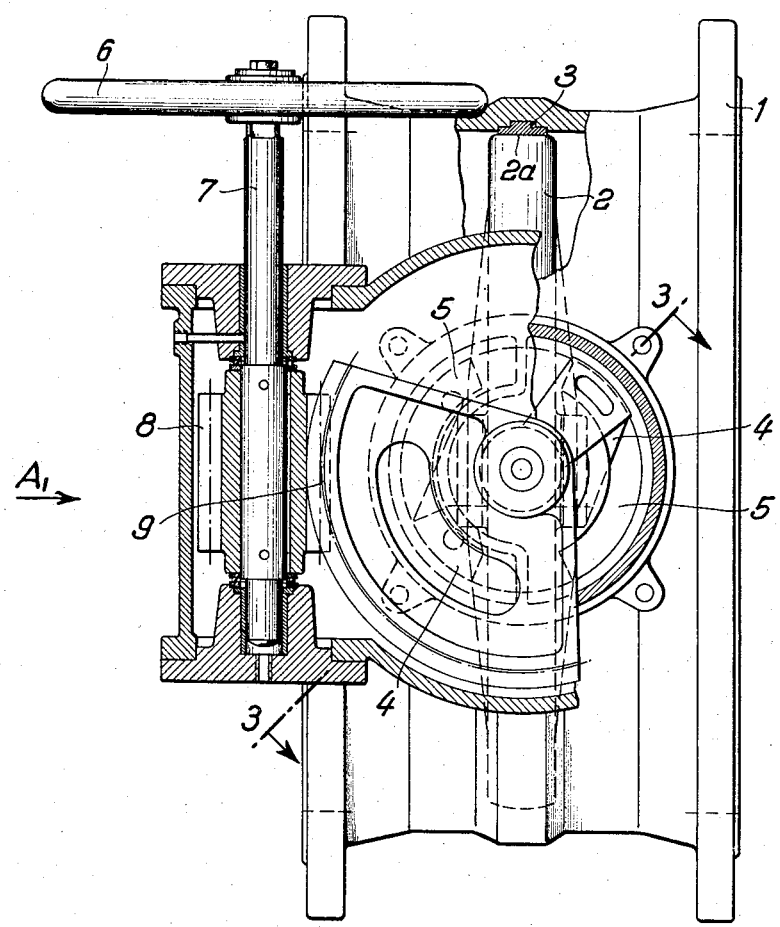
Figure 1 is an elevation of the external rotating mechanism of one form of butterfly valve in accordance with the present invention, partly in axial section.
Figure 2:
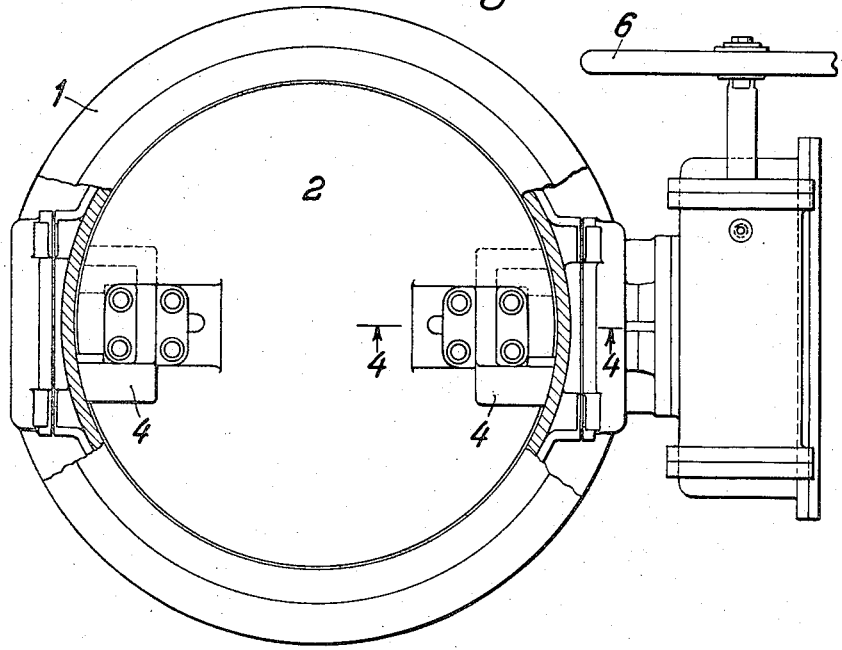
Fig. 2 is a front elevation of the closed butterfly valve, partly in radial section, seen in the direction of the arrow $A_1$ of Fig. 1.
Figure 3:
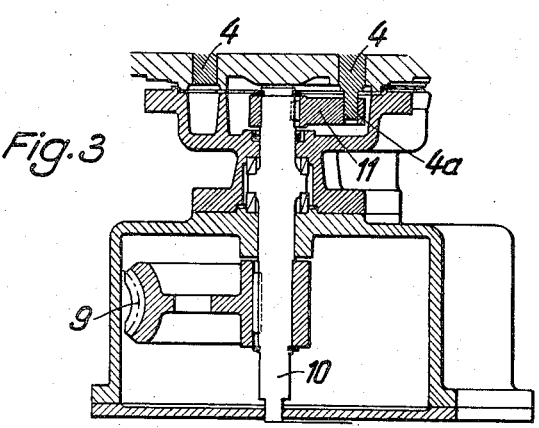
Fig. 3 is a fragmentary section along the lines 3—3 of Fig. 1.
Figure 4:
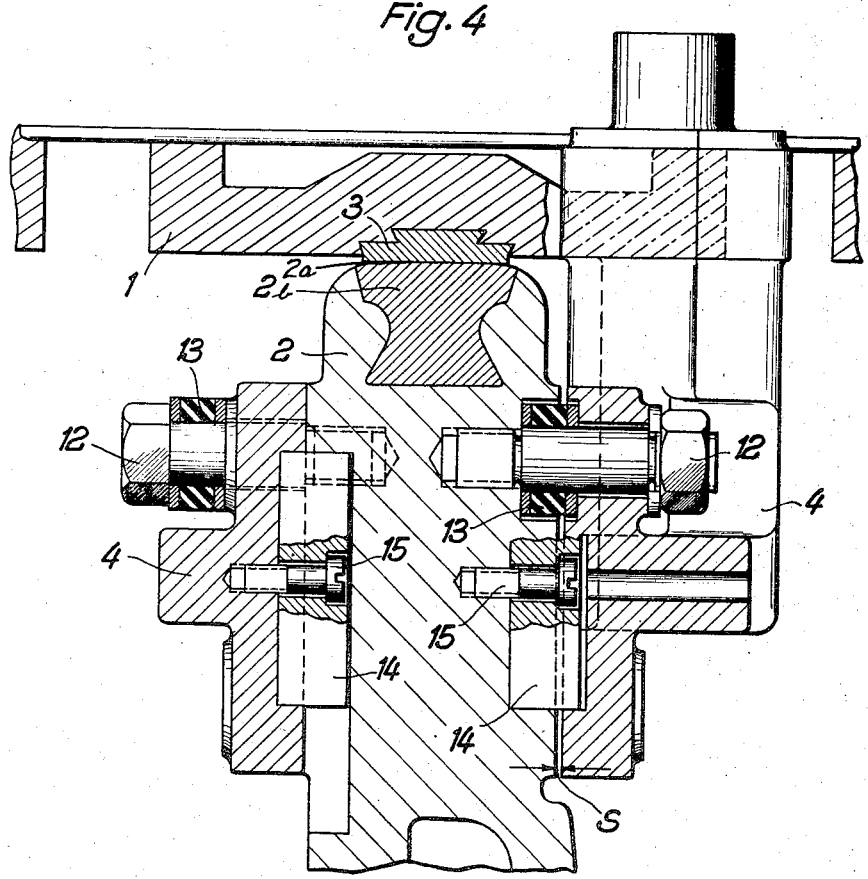
Fig. 4 is a cross section of the elastic bearings of the flap on an enlarged scale along the lines 4—4 of Fig. 2.

Referring now to the drawings and in particular to Figs. 1 to 4, within the casing 1 of the butterfly valve is disposed a flap disc 2 which has a spherical surface 2a on its annular rim (Fig. 1) or has a special metallic or non-metallic sealing ring 2b with a spherical surface (Fig. 4). A sealing ring 3 is disposed on the casing 1 which sealing ring 3 is also constructed with a part spherical surface. As supporting members for the flap disc 2 are used, instead of the usual through shaft which hitherto has given rise to leakage losses, four laterally disposed bearing supports 4, namely two each diametrically opposite in the flap (see Figs. 2 and 3). These bearing supports are mounted to slide on a circular path in four arcuate bearing grooves 5 which are disposed on the left and right sides of the sealing ring 3 of the casing 1 in the casing wall.

For opening and closing the butterfly valve, a hand wheel 6 is used, the spindle 7 of which transmits a pivotal movement, by means of a worm 8 and worm wheel 9, to a shaft 10 which transmits these rotary movements by a crank lever 11 to outer pins 4a on the bearing support 4. The desired position of the flap 2 is brought about by providing the corresponding position of the bearing supports 4. This arrangement and mounting of the flap avoids the necessity to use a flap shaft whereby a condition for perfect fluid tightness of the shut-off member is obtained in the shut-off position.

For additional securing of a perfect seal on the sealing surfaces in the shut-off position of the valve, an elastic connection, as shown in Fig. 4, is used, which is disposed between the bearing supports 4 and the flap 2. This elastic attachment is so constructed that four trunnions or head screws 12 with inserted elastic intermediate members 13 are used as supporting elements for the flap 2. The elastic intermediate members 13 consist, in accordance with Fig. 4, of rubber cushions instead of which, however, spring members or other resilient members may be used. The transmission of the turning moment from the bearing supports 4 to the flap 2 is obtained by key inserts 14 which can be secured by means of headed screws 15 in their position either on the bearing supports 4 or on the flap 2. The pressure exerted by the operating fluid on the flap 2 is thus taken up by the bearing supports 4 and is transmitted to the casing 1, and, on the other hand, the turning moments necessary for the adjustment of the flap 2 are imparted by the drive through the bearing supports 4 of the flap 2.

The perfect sealing of the butterfly valve is first rendered possible by the feature that the flap plate works with a sealing effect over its entire periphery; that is to say the otherwise unavoidable losses at perpiheral gaps cannot occur as they do in the case of the usual through shaft, especially in view of the elastic support of the flap in an axial direction. In fact shortly before the flap 2 has reached its shut-off position transverse to the axis of the pipe line, at the closing of the butterfly valve, the flap is displaced by the static pressure existing in front of it and the elastic intermediate elements 13 are compressed, the disc sliding on the key inserts 14 in the flow direction by an amount $s$ (Fig. 4) out of its central position until the two spherical surfaces of the flap 2 and of the seat ring 3 of the casing are firmly pressed on one another and sealed. The static pressure in front of the closed butterfly throttle valve then keeps the flap hermetically sealed in this position.

The butterfly valve in accordance with the present invention is suitable not only for liquids, but also for gaseous working media or for vapours. Structural details may vary for accommodation to the form of construction shown in the drawings without departing from the scope of the present invention. For example, the selection of the structural materials used for the individual parts is of no significance for the invention; the same applies to the construction of the elastic members 26 as rubber buffers or any other resilient bodies.

While I have disclosed one embodiment of the present invention, it is to be understood that this embodiment is given by example only and not in a limiting sense, the scope of the present invention being determined by the objects and the claims.

I claim:

1. A butterfly valve including in combination, a casing having a spherical valve seating, a flap disc movable in said casing from an open inoperative position into closing operative position, centrically disposed pivotal bearings supporting said flap disc in said casing, means for displacing said flap disc about the axis of said pivotal bearings, resilient cushioning means between said flap disc and said pivotal bearings, a flap seating having a spherical surface complementary to that of said valve seating mounted on said flap disc and engaging said valve seating in the closed position of said valve and adapted to be urged by the static pressure of the shut-off medium into better contact with said spherical valve seating by axial movement of said flap disc together with said flap seating relative to said pivotal bearings in the closed operative position of said valve.

2. The valve, as set forth in claim 1, which includes means exterior of said casing and projecting therethrough for turning said flap disc about the axis of said pivotal bearings.

3. The valve, as set forth in claim 1, which includes pivotal pins projecting from said flap disc, and resilient bushings surrounding said pivotal pins in said casing.

4. The valve, as set forth in claim 1, wherein said casing has arcuate recesses and guide shoes cooperating with said flap disc and received by said arcuate recesses in said casing.

References Cited in the file of this patent

UNITED STATES PATENTS

| | | |
|---|---|---|
| 1,591,903 | White | July 6, 1926 |
| 1,682,075 | Foulds | Aug. 28, 1928 |
| 1,744,798 | Price | Jan. 28, 1930 |
| 1,951,283 | Kinzie | Mar. 13, 1934 |
| 2,707,614 | Saar | May 3, 1955 |

FOREIGN PATENTS

| | | |
|---|---|---|
| 197,000 | Great Britain | May 2, 1923 |
| 163,082 | Switzerland | Sept. 16, 1933 |
| 613,700 | Germany | of 1935 |
| 237,059 | Switzerland | of 1945 |
| 1,008,139 | France | Feb. 13, 1952 |